(12) United States Patent
Retti et al.

(10) Patent No.: US 11,146,206 B2
(45) Date of Patent: Oct. 12, 2021

(54) PORTABLE SOLAR POWER GENERATOR WITH ENERGY STORAGE

(71) Applicant: GRIDKICKER LLC, Towson, MD (US)

(72) Inventors: Kahrl Retti, Parkville, MD (US); Nicholas Richard Retti, Towson, MD (US)

(73) Assignee: GRIDKICKER LLC, Towson, MD (US)

( * ) Notice: Subject to any disclaimer, the term of this patent is extended or adjusted under 35 U.S.C. 154(b) by 0 days.

(21) Appl. No.: 16/585,602

(22) Filed: Sep. 27, 2019

(65) Prior Publication Data

US 2020/0106383 A1 Apr. 2, 2020

Related U.S. Application Data

(60) Provisional application No. 62/738,193, filed on Sep. 28, 2018.

(51) Int. Cl.
| | | |
|---|---|---|
| *H01L 31/042* | (2014.01) | |
| *H02N 6/00* | (2006.01) | |
| *H02S 10/40* | (2014.01) | |
| *H02S 30/20* | (2014.01) | |
| *F24S 30/455* | (2018.01) | |
| *H02S 20/32* | (2014.01) | |

(52) U.S. Cl.
CPC ............ *H02S 10/40* (2014.12); *F24S 30/455* (2018.05); *H02S 20/32* (2014.12); *H02S 30/20* (2014.12)

(58) Field of Classification Search
CPC .......... H02S 10/40; H02S 30/20; H02S 20/32; H02S 40/38; H02S 20/30; F24S 30/455; F24S 30/425; F24S 2030/16; F24S 2025/012; Y02E 10/50; Y02E 10/47
See application file for complete search history.

(56) References Cited

U.S. PATENT DOCUMENTS

| | | | |
|---|---|---|---|
| 6,396,239 B1 * | 5/2002 | Benn ...................... | H02S 10/40 320/101 |
| 9,673,346 B1 | 6/2017 | Martin | |
| 2002/0108648 A1 * | 8/2002 | Nixon ..................... | H02S 40/38 136/244 |
| 2002/0180404 A1 | 12/2002 | Benn et al. | |
| 2011/0253193 A1 * | 10/2011 | Korman ............. | H01L 31/0512 136/245 |
| 2014/0028242 A1 | 1/2014 | Akin et al. | |
| 2015/0007869 A1 | 1/2015 | Stein | |
| 2016/0149538 A1 | 5/2016 | Prypin et al. | |
| 2016/0197575 A1 | 7/2016 | Armstrong et al. | |
| 2016/0218664 A1 * | 7/2016 | Wehrli ................... | F24S 25/70 |
| 2016/0294191 A1 * | 10/2016 | Armstrong ............. | H02S 30/20 |
| 2017/0141721 A1 | 5/2017 | Schmidt | |

* cited by examiner

*Primary Examiner* — Angelo Trivisonno
(74) *Attorney, Agent, or Firm* — Dickinson Wright, PLLC

(57) ABSTRACT

Disclosed is an apparatus for a solar power generator as it relates to a portable and expandable solar power generator that can form a micro-grid power system comprising any elements described, either individually or in combination with any other elements, in any order.

8 Claims, 17 Drawing Sheets

PORTABLE SOLAR POWER GENERATOR WITH ENERGY STORAGE

CROSS REFERENCE TO RELATED APPLICATION

The present application claims the benefit under 35 U.S.C. 119(e) of U.S. Provisional Patent Application No. 62/738,193, the entire disclosure of which is hereby incorporated by reference.

FIELD OF THE INVENTION

The present disclosure relates to a solar power generator. More particularly, the present disclosure relates to a portable and expandable solar power generator having battery storage that can form a micro-grid power system.

BACKGROUND

Solar (photovoltaic) cells convert light (solar or ambient) energy into electricity. Solar cells can be grouped into larger devices called solar panels. The effectiveness of solar panels can be affected by the type of light energy available to the solar panels. For example, ambient light within a room can be used by a solar panel to generate electricity, however exposing the solar panel to sunlight can often (though not always) produce higher levels of electricity.

Solar panels may be connected to energy storage devices (batteries) to store electrical energy captured by the solar panels. The batteries may be of a variety of types, such as lithium-polymer (LiPo) and may be continually charged by the solar panels with DC, provided there is sufficient light energy available. Typically, the batteries are not configured to receive electrical energy from another source, such as AC (mains) power, to charge the batteries in situations where light energy is insufficient or the rate of charge via only light energy is not sufficient. Solar panels may be configured with an inverter, which converts DC to AC for use with electrical devices that require AC rather than DC power.

Solar panels may also be connected to energy management systems. These systems may be configured to regulate the rate of charging to the solar panel batteries. However, these systems are limited by their ability to only manage energy from solar panels and not from other sources (mains power). Further, these systems are not configured to optimize the lifespan of the solar panel batteries, often resulting in overcharging of the batteries due to excessive light energy and the lack of equipment to appropriately deal with the excess energy from the solar panels.

What is needed is a portable, modular solar power generator with energy storage capacity and an energy management system to process both direct current (DC) and AC power and the capability to form a micro-grid power system.

SUMMARY

This section provides a general summary of the inventive concepts associated with this disclosure and is not intended to be interpreted as a complete and comprehensive listing of all of its aspects, objectives, features and advantages.

The present disclosure includes articles of manufacture, systems and processes that relate to a portable, modular solar power generator with energy storage capacity and an energy management system to process both DC and AC power, including the capacity to form a micro-grid power system.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected aspects and not all possible implementations, and are not intended to limit the scope of the present disclosure.

Throughout the drawings, like reference numbers should be understood to refer to like elements, features and structure.

DETAILED DESCRIPTION

Figure 1:
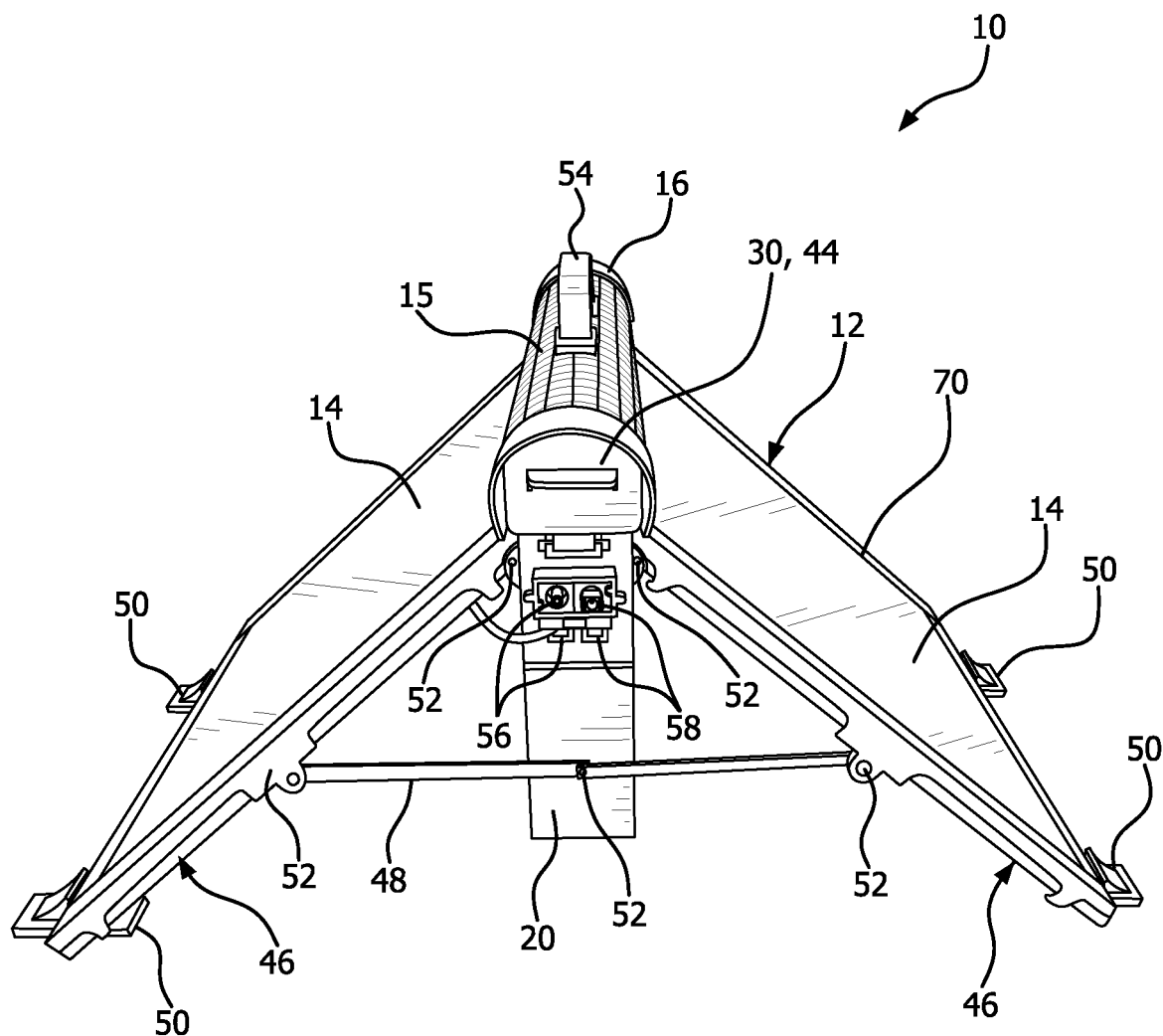
FIG. 1 is a front side view of a solar power generator according to an aspect of the disclosure.

Exemplary aspects will now be described more fully with reference to the accompanying drawings. In particular, a number of non-limiting aspects of a portable, modular solar power generator with energy storage capacity and an energy management system to process both DC and AC power, including the capacity to form a micro-grid power system is provided so that this disclosure will be thorough and will fully convey the true and intended scope to those who are skilled in the art. It will be apparent to those skilled in the art that specific details need not be employed, that example aspects may be embodied in many different forms and that neither should be construed to limit the scope of the disclosure. It should also be appreciated that the present disclosure can be utilized in connection with other types of vehicle components not described fully herein.

Referring generally to the figures, the present disclosure may include a portable, modular solar power generator with energy storage capacity and an energy management system to process both DC and AC power, including the capacity to form a micro-grid power system. The solar power generator may include one or more solar panels connected to an energy storage device and a control system.

The solar power generator may be deployed by placing the solar power generator in a position to receive light energy (either solar, ambient, or a combination thereof). Once deployed, the solar power generator may begin converting the light energy into electricity, such as AC or DC power. The solar power generator may include one more electrical connections, such as electrical receptacles (sockets) to receive electrical plugs from one or more electrically-powered devices and provide electrical energy to those electrically-powered devices.

The solar power generator may include an energy management (control) system. The control system may be configured to regulate the light energy generated by the solar panels of the solar power generator. The control system may also be configured to manage the conversion of energy from DC (collected from the solar panels) to steady-state AC. The control system may also include one or more algorithms (software) to manage the charging and discharging of the batteries (or other energy storage devices) of the solar power generator. The algorithms may include battery performance and battery-saving elements, to maximize the operation of the batteries, including but not limited to, charging and discharging of the batteries.

The solar power generator may be configured to operate independently (as a single unit) or together with other units of the solar power generator to form a field or array (a micro-grid). The solar power generator configured as a micro-grid allows for increased power generation and storage depending on the number of solar power generators joined together, the available light energy, and the available battery capacity of the micro-grid of solar power generators. The micro-grid configuration of solar power generators can provide electrical power autonomy if one solar power generator is taken offline, such as for maintenance or addition of more battery capacity.

The solar power generator may be configured in a number of capacities, such as, but not limited to, 1200 Watts to 5 KW. The solar power generator may also be expanded up to 20 MW for large-scale installations with centralized energy storage (batteries). The batteries can be removable/replaceable with a portion of the solar power generator being separable from the support frame.

The solar power generator may be easily positioned or installed at a location. For example, the solar power generator may be deployed without complicated and expensive racking systems, such as on a rooftop or an open field. The solar power generator may include self-ballasting to allow for ease of deployment and portability, including connection with additional solar power generators to form a micro-grid.

The solar power generator control system may be configured to continuously monitor the performance of the solar panels and the charging and discharging of the batteries. The control system may include one or more algorithms (programs) that may be connected to sensors within the solar power generator to monitor the state of charge of the batteries as well as other operating parameters of the solar power generator.

The solar power generator may be configured to recharge the solar power generator batteries using light energy (solar, ambient) as well as AC power. For example, during the daytime, the solar power generator may charge the solar power batteries using light (solar) energy, while during nighttime (or low solar, ambient light conditions) the solar power generator may charge the solar power generator batteries using AC power, which may be at reduced cost due to variable pricing of existing power suppliers.

Referring generally to the figures, the solar power generator 10 may include at least one flat solar panel 12 including a plurality of solar cells 14, a housing 16, an inverter 18, one or more batteries 20 and a battery management control system (not shown).

According to an aspect of the disclosure, the flat solar panel 12 with a plurality of flat solar cells 14 may be disposed in a frame 46 (see FIG. 1, for example). The frame 46 may include one or more frame support arms 48 and a plurality of hinges 52. The frame 46 may be configured to support the solar panels 12 (including the solar cells 14), the housing 16, the inverter 18 (within the housing 16), and one or more batteries 20. The support arms 48 and the hinges 52 may be configured to permit the frame 46 to move from at least a folded position (for storage, to minimize space) to a plurality of extended positions to expose the solar panels 12 to light energy (solar, ambient). The frame 46, the support arms 48, and the hinges 52 may include locking mechanisms that prevent movement from one position to another unexpectedly, such as a locking or detent mechanism. Additionally and alternatively, the frame 46, the support arms 48, and the hinges 52 may include a motorized frame operating device (not shown) that may allow the frame 46, the support arms 48, and the hinges 52 to move from one position, such as folded, to another position, such as fully extended/expanded. The motorized frame operating device may be included with the frame 46, the support arms 48, or the hinges 52 and may be configured as axial or worm-drive motors, for example. Additionally and alternatively, the motorized frame operating device may be external to one or more of the frame 46, the support arms 48, and the hinges 52. For example, the motorized frame operating device may be an add-on to the solar power generator 10. Additionally and alternatively, the motorized frame operating device may be remotely operable, such as via wireless communication or by the control system of the solar power generator 10.

According to an aspect of the disclosure, the solar panels 12 of the solar power generator 10 may include one or more solar cells 14. The solar cells 14 may be disposed in an array (grid) in the solar panels 12. The solar (photovoltaic) cells 14 may be configured as an electrical device that converts the energy of light (solar, ambient) directly into electricity by the photovoltaic effect, a physical and chemical phenomenon. The solar cells 14 may be configured as a form of a photoelectric cell, a device whose electrical characteristics, such as, but not limited to, current, voltage, or resistance vary when exposed to light. The operation of the solar cells 14 (photovoltaic cells, PV) require at least three elements: the ability to absorb light, generating either electron hole pairs or excitons; the separation of charge carriers of opposite types; and the separate extraction of the charge carriers to an external circuit (such as an inverter or battery). The solar cells 14 may be configured as amorphous solar cells, monocrystalline solar cells, or a combination thereof. Additionally and alternatively, the solar cells 14 may be replaceable/interchangeable with the same or other types of solar cells 14 depending upon the local operating conditions, developments in solar cells 14, or due to damage from storms, for example.

According to an aspect of the disclosure, the housing 16 of the solar power generator 10 may be configured to receive one or more components of the solar power generator 10, such as, but not limited to, the inverter 18, one or more AC outlets 22, a battery charger input 24, an AC/battery charge switch 26, power status lights 28, an AC outlet access panel 30, a battery/PV meter switch 32, a battery meter display 34, a PV meter display 38, battery status lights 40, a battery charge switch 42, a battery charge access panel 44, and a handle 54. The housing 16 may be configured to receive the solar panels 12 and the solar cells 14 via the frame 46 and one or more hinges 52. The housing 16 may be configured with electrical wiring and/or connections between the solar panels 12, solar cells 14, the battery 20, negative connectors 56, positive connectors 58, microgrid connectors 68 (see e.g., FIG. 14), and solar panel connectors 66 (see e.g., FIG. 2). The housing 16 may be constructed of a variety of materials, such as ceramic, composite, or other suitable materials. Additionally and alternatively, the housing 16 may be configured with a plurality of rounded solar cells 15 (see FIGS. 1, 3-4 and 6 for example), which may or may not be of a different type than the flat solar cells 14. In other words, the solar cells 14, 15 can be the same type of solar cells but configured in different formations (flat and curved surfaces) or different types of solar cells configured in different formations, such as for different performance characteristics. The rounded or tube shaped solar panel has the advantage of consistent surface area exposure over a full duration of the Sun's transit across the sky.

According to an aspect of the disclosure, the inverter 18 of the solar power generator 10 may be configured as an electronic device or circuitry that can convert direct current (DC) to alternating current (AC). Many electronic devices use either DC or AC current, but are not configured to use both. The inverter 18 permits devices that use AC power to receive electrical energy from the solar power generator 10, just as provided by the existing electrical grid. The inverter 18 may be configured to receive power from the batteries 20 of the solar power generator 10.

According to an aspect of the disclosure, the battery 20 of the solar power generator 10 may be configured as a single battery cell or an array of cells. The battery 20 may be disposed beneath the housing 16 of the solar power generator 10 (see FIG. 6, for example). The battery 20 may be configured with one or more connectors, such as negative connectors 56 and positive connectors 58. The connectors may be configured to connect the solar power generator 10 to one or more additional solar power generators 10 (to begin to form a microgrid M) or to connect a first battery 20 to one or more additional batteries 20 (to expand the energy storage capacity of the battery 20), for example. The battery 20 may be configured to include modularity that permits additional batteries 20 to be added (connected) to the battery 20 to expand the electrical energy storage capacity of the battery 20. Additionally and alternatively, one or more batteries 20 may be disconnected from the battery 20 to reduce the energy storage capacity of the battery 20, such as to make the solar power generator 10 with battery 20 smaller or lighter for storage, transportation, maintenance, or purchase. The battery 20 may be configured as a lithium-polymer (LiPo) battery. The battery 20 configured as a LiPo battery may be in a pouch format. Unlike other types of batteries that include cylindrical or prismatic cells, LiPo batteries may be configured as a soft package or pouch, which reduces their weight relative to other battery types and also makes them less rigid. LiPo batteries also include improved safety versus other batteries, such as lithium-ion batteries. Lithium-ion batteries have exhibited overheating and resultant thermal damage during charging or discharging cycles when compared to LiPo batteries. Additionally and alternatively, the battery 20 may include other types of batteries, including a combination of battery types.

Figure 3:
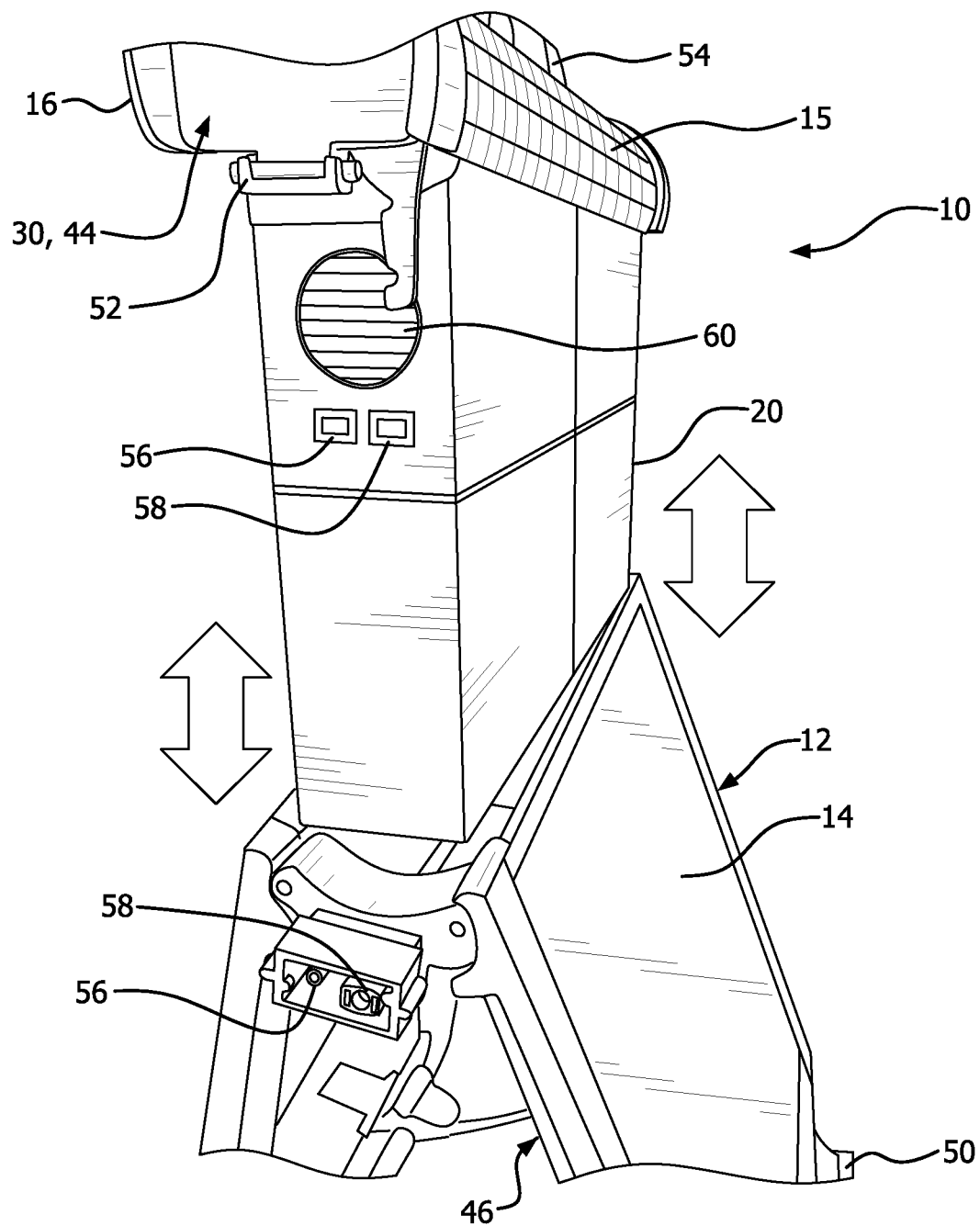
FIG. 3 is partial front view of the solar power generator of FIG. 1 with the frame and side solar panels being separated from the rest of the solar power generator, according to an aspect of the disclosure.
Figure 4:
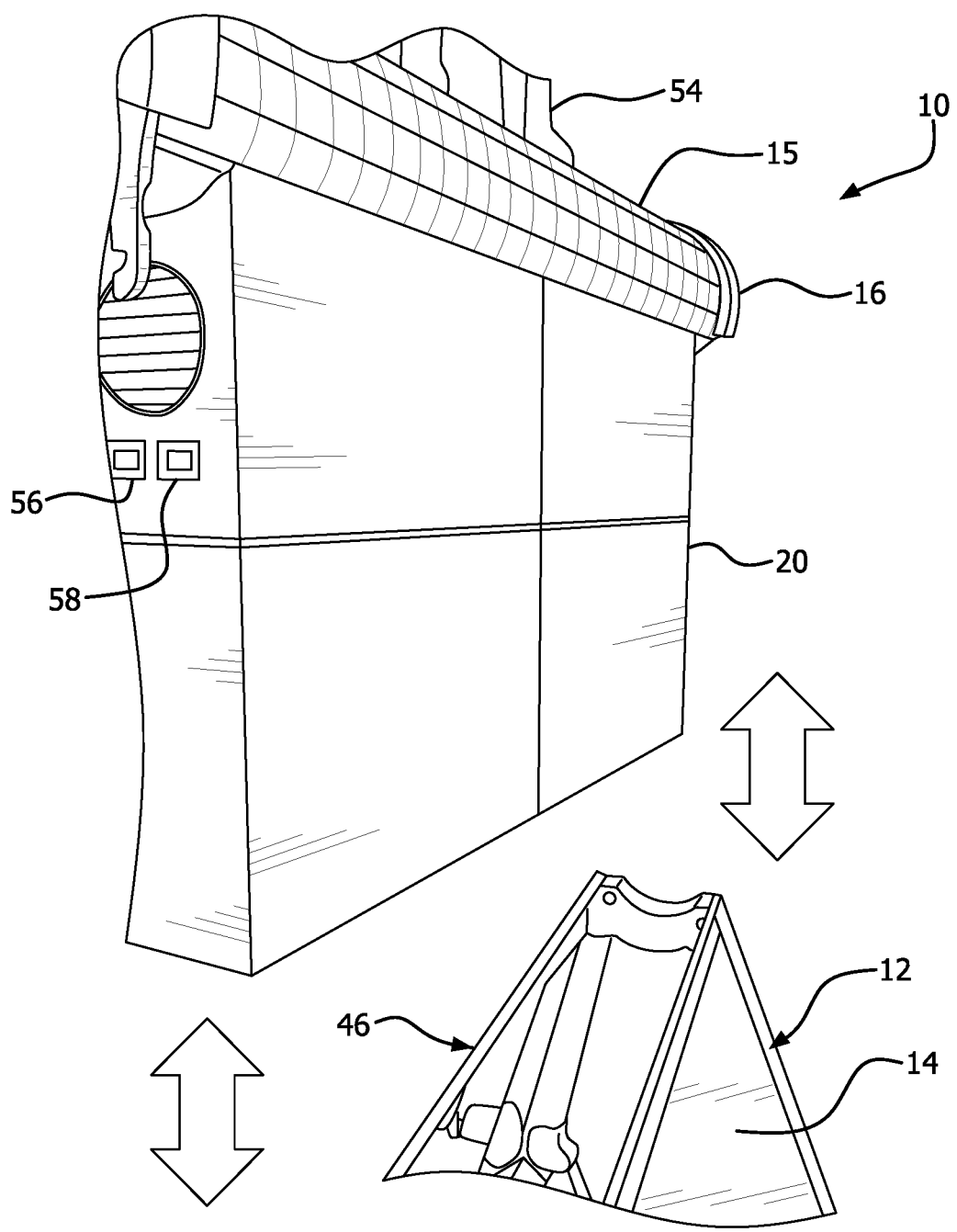
FIG. 4 is partial front view of the solar power generator of FIG. 1 with the frame and side solar panels being separated from the rest of the solar power generator, according to an aspect of the disclosure.
Figure 5:
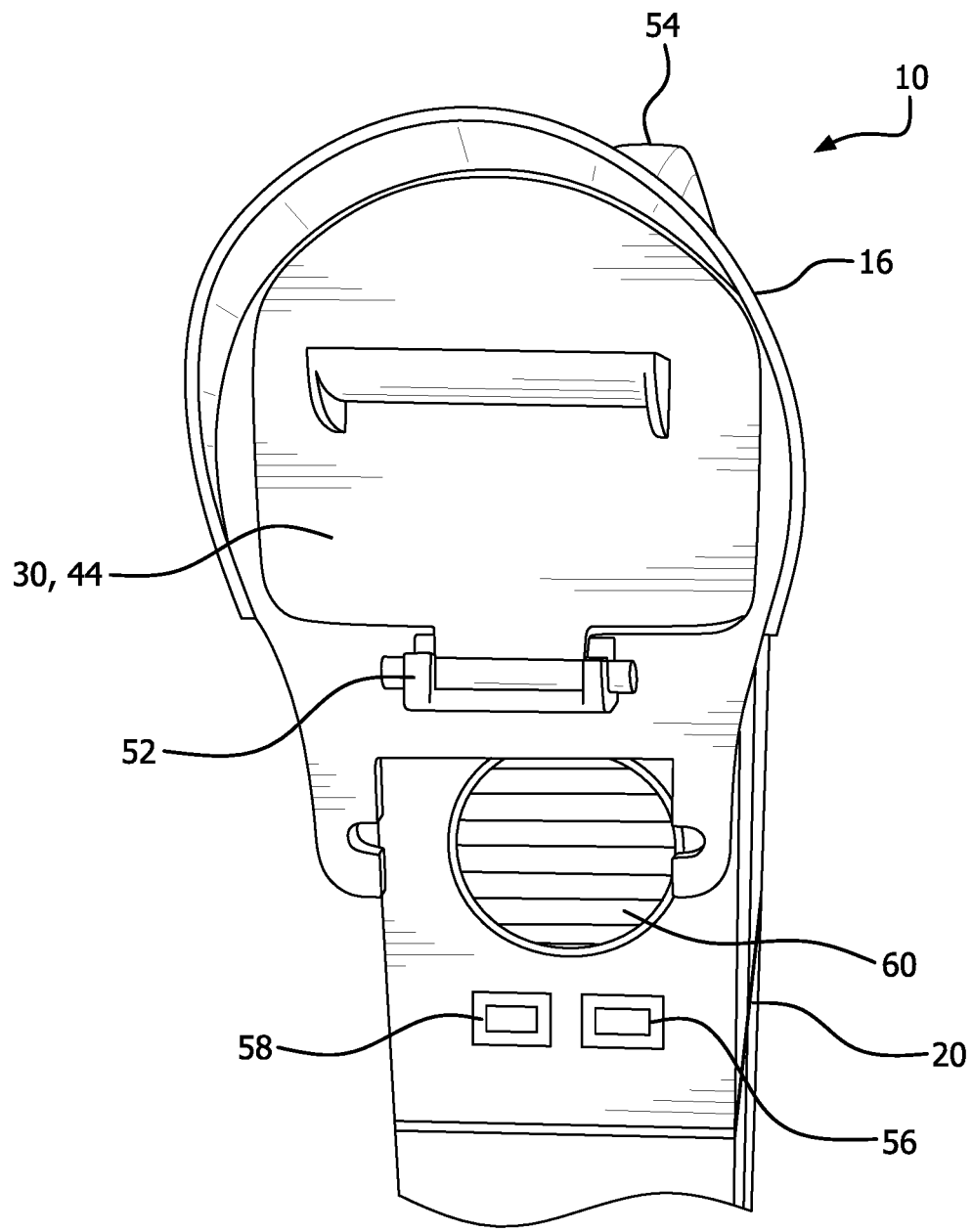
FIG. 5 is a partial rear view of the solar power generator of FIG. 1, according to an aspect of the disclosure.
Figure 6:
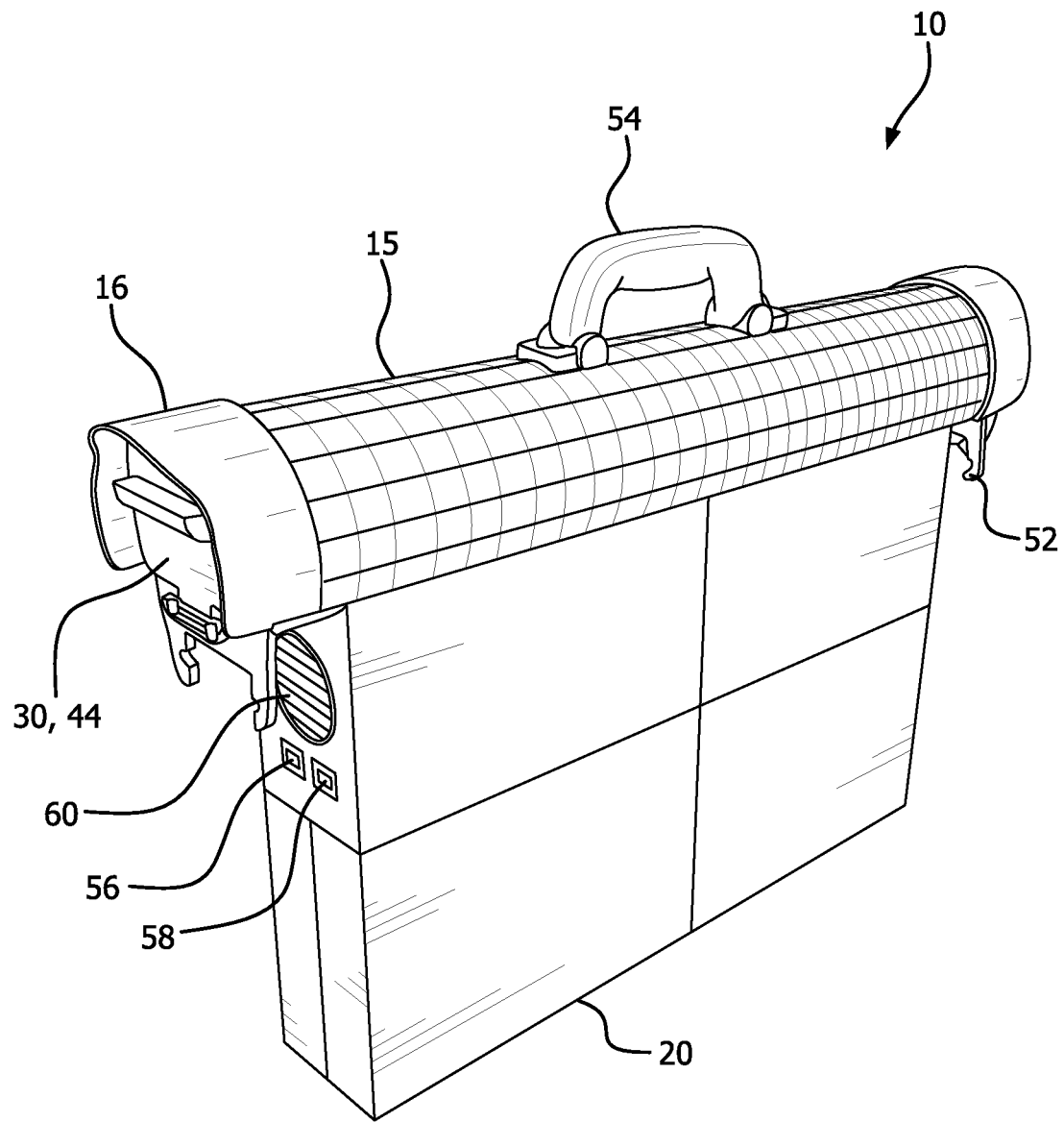
FIG. 6 is a side perspective view of the solar power generator of FIG. 1, according to an aspect of the disclosure.
Figure 7:
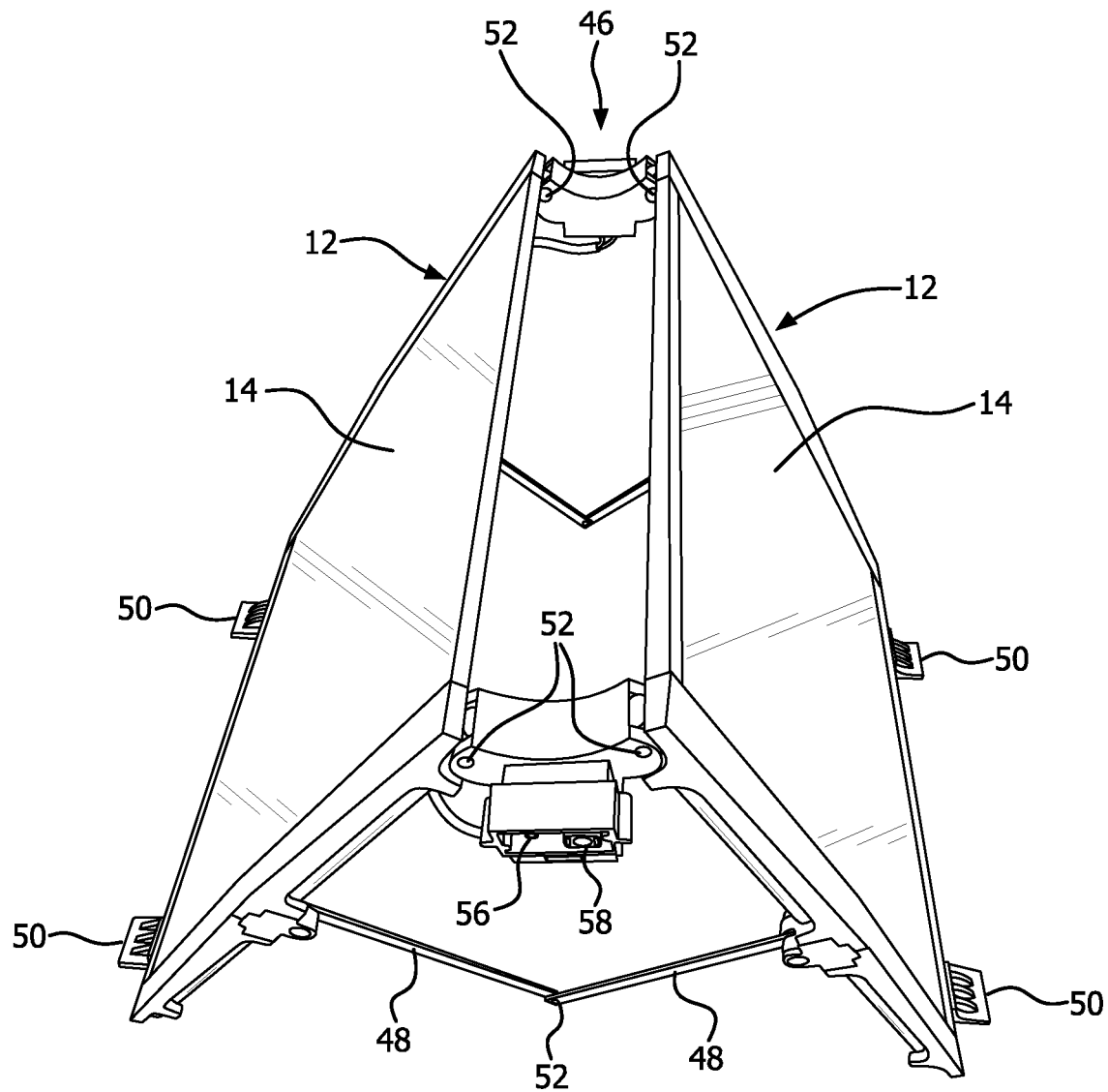
FIG. 7 is a front perspective view of the frame of the solar power generator of FIG. 1, according to an aspect of the disclosure.
Figure 8:
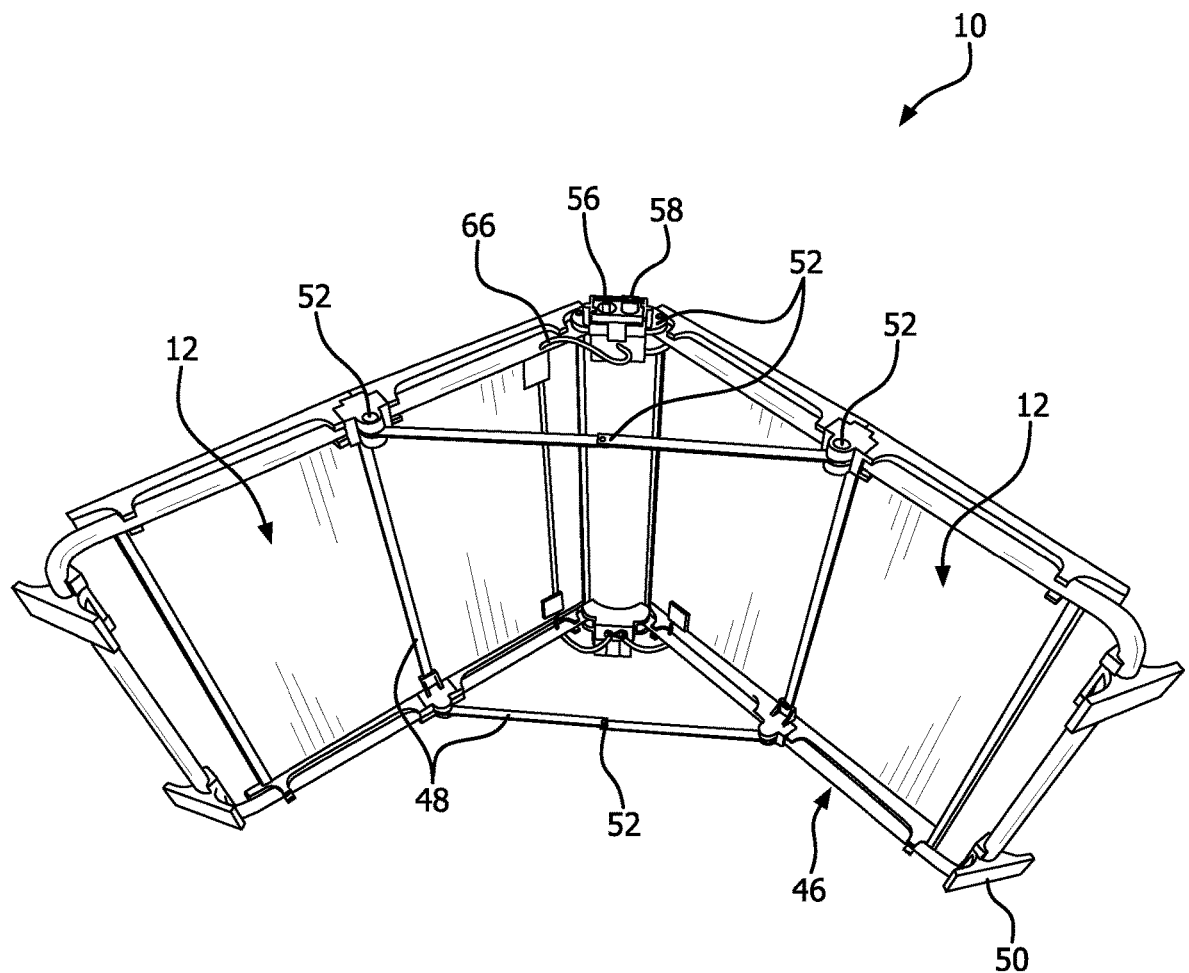
FIG. 8 is a bottom perspective view of the frame of the solar power generator of FIG. 1, according to an aspect of the disclosure.

According to an aspect of the disclosure, the battery 20 may be removable with a portion of the solar power generator 10. As shown in FIGS. 3-4, the battery 20, connected to the housing 16 of the solar power generator 10, may be removed or installed in the frame 46. This configuration permits a first housing 16/battery 20 combination to be removed and replaced with a second housing 16/battery 20 combination or a reconfigured first housing 16/battery 20 combination (such as with a different type of capacity of batteries).

According to an aspect of the disclosure, the battery 20 may be configured with one or more LiPo battery packs or pouches (not shown). The LiPo batteries 20 may include on-board electronic safety features such as temperature sensing and moisture sensing. Each LiPo battery 20 may be enclosed in a ceramic enclosure with embedded Nomex® for additional heat and fire protection.

Figure 9:
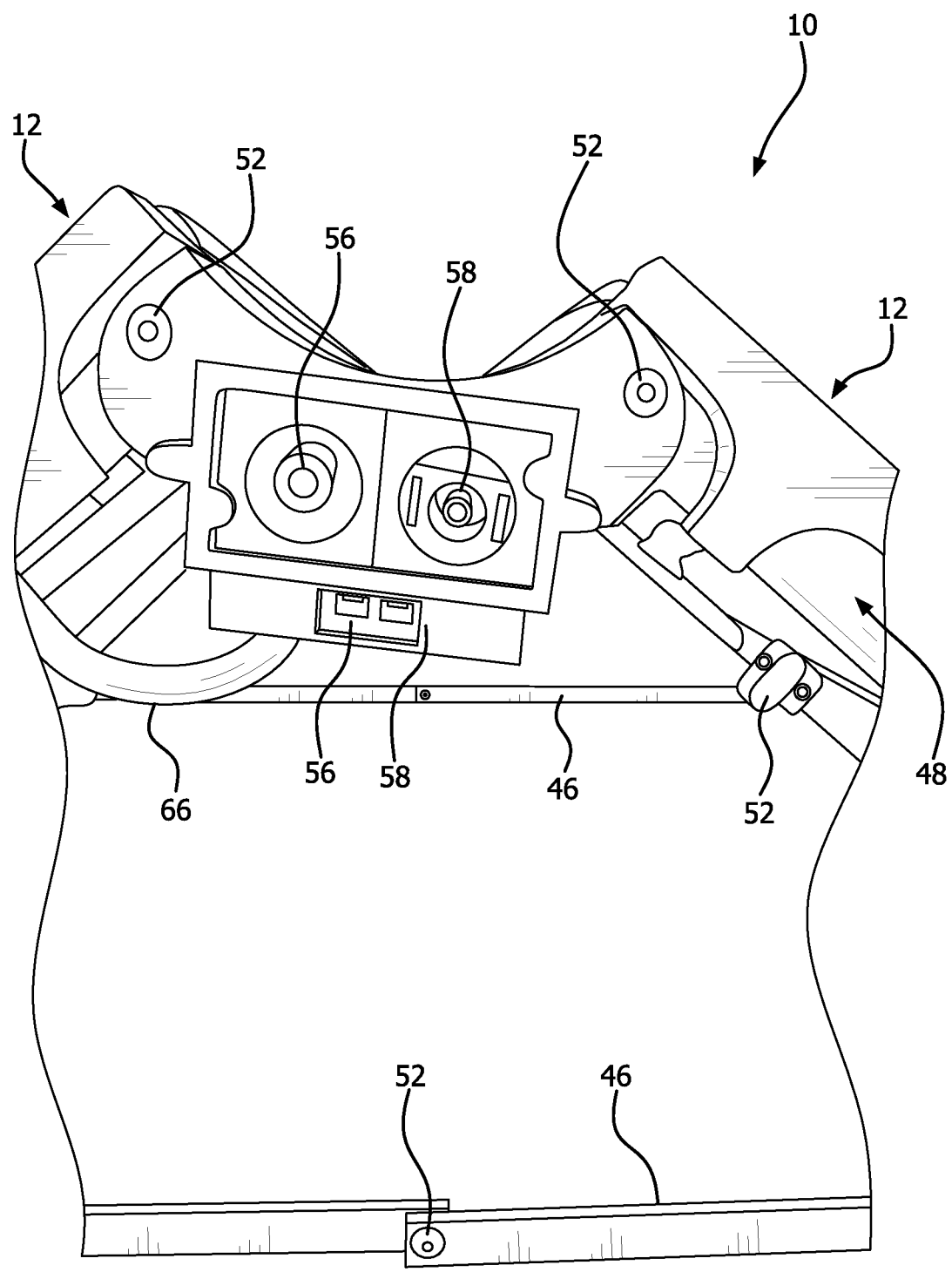
FIG. 9 is a partial front view of the frame showing the positive and negative electrodes of the solar power generator of FIG. 1, according to an aspect of the disclosure.

The AC outlets 22 of the solar power generator 10 may be disposed in one end of the housing 16 (see FIG. 9). The AC outlets 22 may be protected by an AC outlet access panel 30 that may be connected to the housing 16 by a hinge 52. The AC outlets 22 may be connected to the inverter 18 within the housing 16 to receive the AC output of the inverter 18, converted from DC generated by the solar cells 14 of the solar panels 12. For example, the AC outlets 22 may be configured with the inverter 18 to supply 1500 Watts per AC outlet 22.

The battery charger input 24 of the solar power generator 10 may be disposed in one end of the housing 16 (see FIG. 9). The battery charger input 24 may be protected by an AC outlet access panel 30 that may be connected to the housing 16 by a hinge 52. The battery charger input 24 may be connected to the inverter 18, the battery 20, the AC/battery charger switch 26, and the battery charge status lights 40. The battery charger input 24 may be configured to receive a solar power generator battery charging cord (not shown) that may permit the solar power generator 10 (with battery 20) to be charged by AC (mains) power from the existing electrical grid.

The AC/battery charger switch 26 of the solar power generator 10 may be disposed in one end of the housing 16 (see FIG. 9). The AC/battery charger switch 26 may be protected by an AC outlet access panel 30 that may be connected to the housing 16 by a hinge 52. The AC/battery charger switch 26 may be configured solar power generator control system and as a toggle switch with at least three positions—battery charging ON, OFF, and AC power inverter ON. The AC/battery charger switch 26 may be configured to activate a battery charging cycle, such as when the solar power generator battery charging cord is plugged into the battery charger input 24. Additionally and alternatively, the AC/battery charger switch 26 may be configured to toggle between the battery charging cycle and an AC power distribution cycle when AC power is converted from the solar panels 12 and/or the battery 20 of the solar power generator 10.

Figure 10:
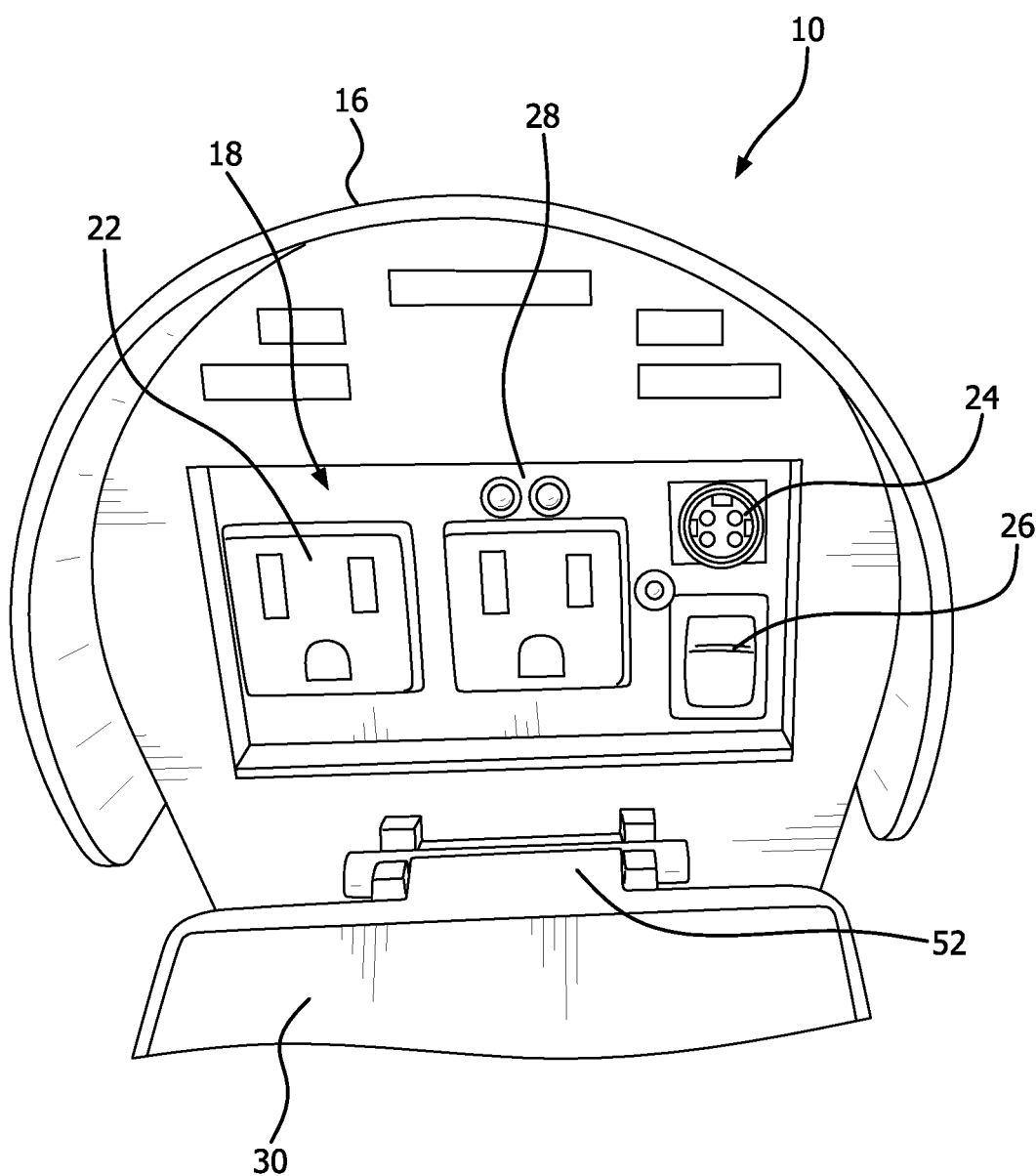
FIG. 10 is a front view of the AC outlets, power status lights and the battery charging connector and switch of the solar power generator of FIG. 1, according to an aspect of the disclosure.

The AC power status lights 28 of the solar power generator 10 may be disposed in one end of the housing 16 (see FIG. 10). The AC power status lights 28 may be protected by an AC outlet access panel 30 that may be connected to the housing 16 by a hinge 52. The AC power status lights 28 may be configured with the inverter 18, the battery 20 and the solar power generator control system (not shown). The AC power status lights 28 may be configured with a green light and a red light (such as light emitting diodes "LEDs") to provide a user of the solar power generator 10 with AC power status information. For example, when the AC/battery charger switch 26 is toggled to the AC power side of the AC/battery charger switch 26, the inverter 18, battery 20 and the solar power generator control system may be configured to provide AC power to the AC outlets 22 if predetermined performance parameters are satisfied. If those parameters are satisfied, then the green AC power status light 28 may be illuminated, either by the inverter 18, battery 20 and the solar power generator control system or a combination thereof. Additionally and alternatively if the parameters are not satisfied (low battery power) then the red AC power status light 28 may be illuminated, either by the inverter 18, battery 20 and the solar power generator control system or a combination thereof. As a result, no AC power may available at the AC outlets 22. It should be understood that any implementation of lights in the solar power generator 10 as described herein may be implemented in other forms and types, such as gauges, numerical readouts, or via computer applications ("apps").

Figure 11:
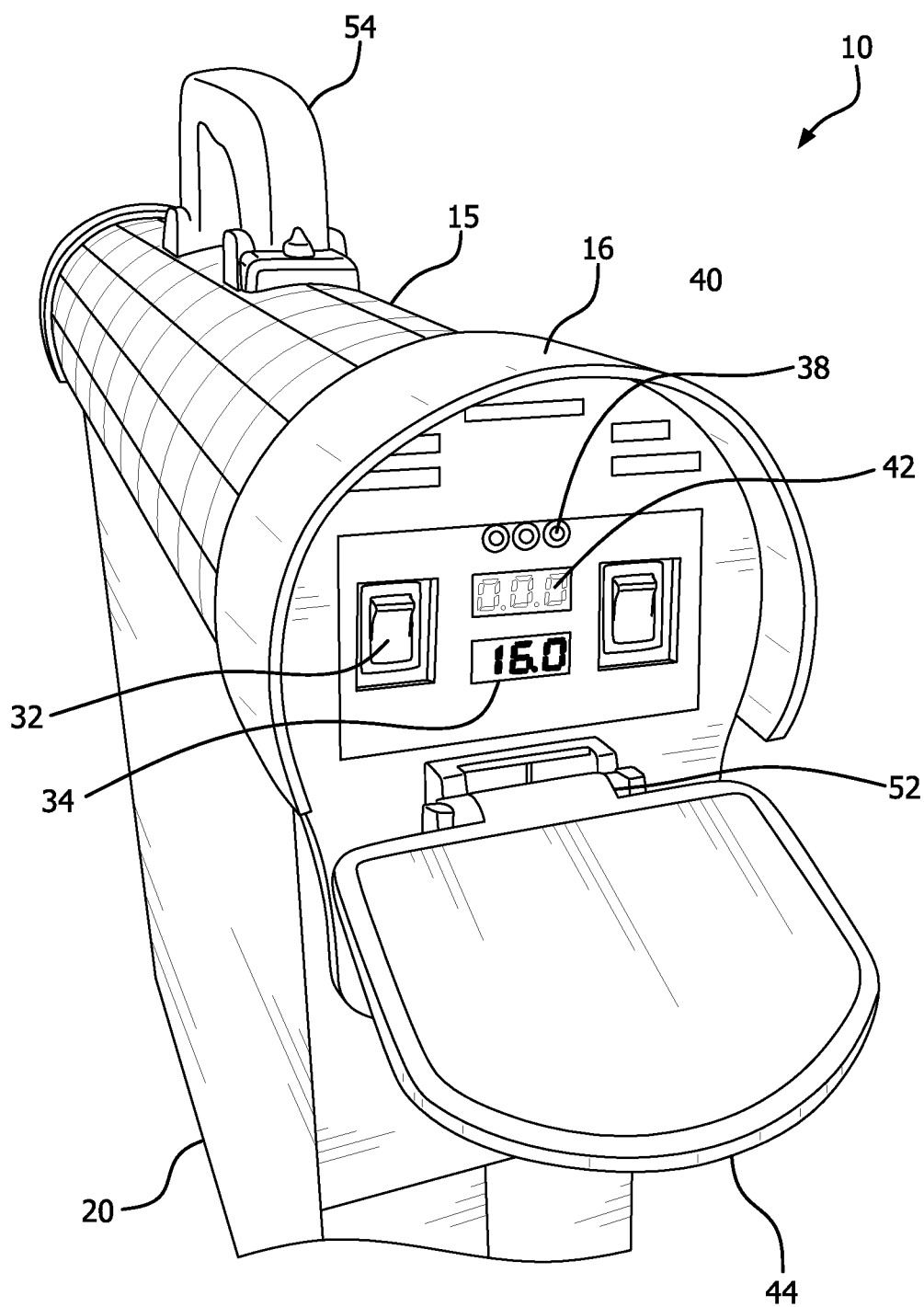
FIG. 11 is a partial front perspective view of the PV meter switch and display, battery charge switch, and battery charge status lights of the solar power generator of FIG. 1, according to an aspect of the disclosure.
Figure 12:
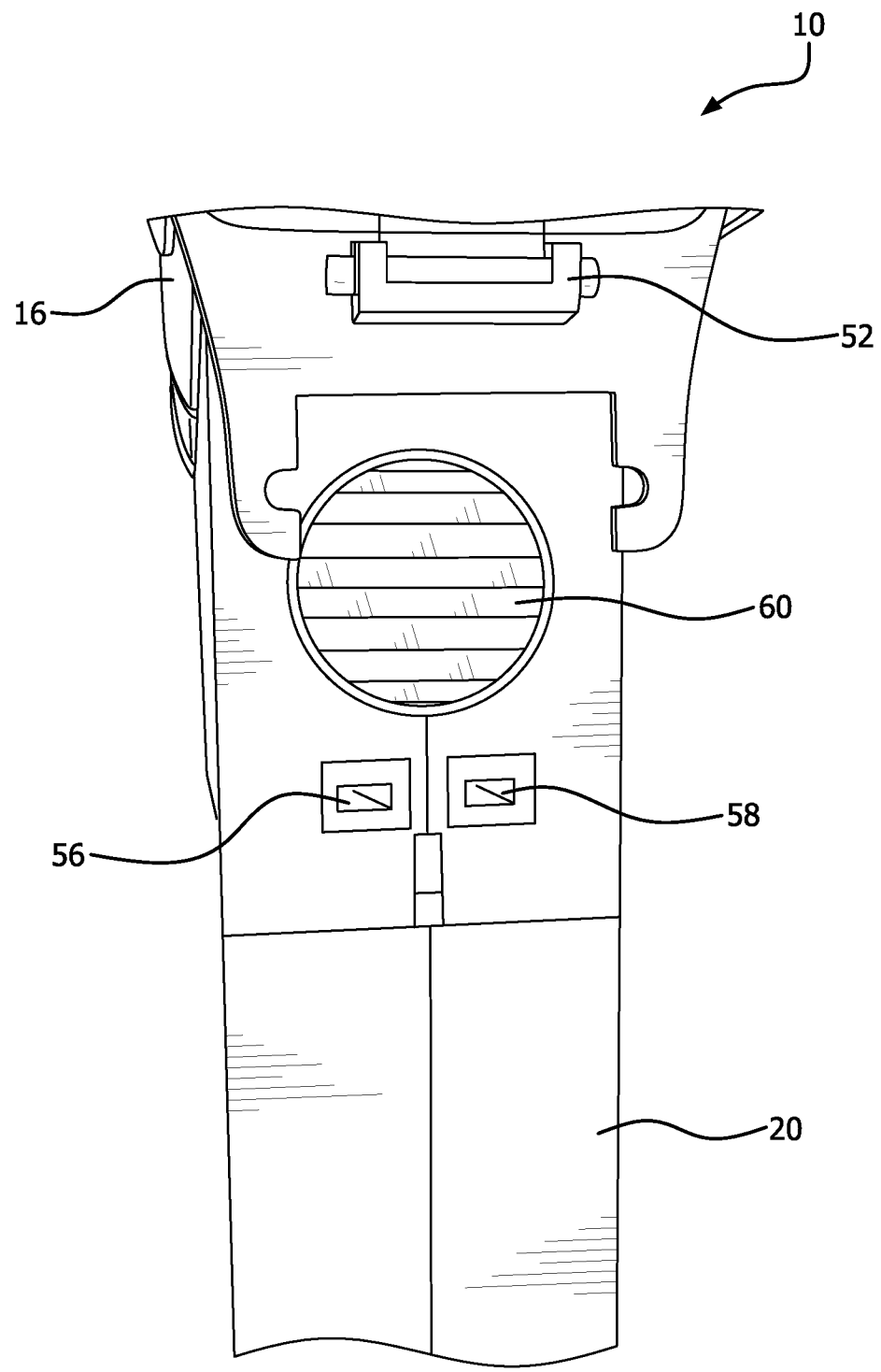
FIG. 12 is a partial rear view of the cooling fan opening and positive and negative connectors of the solar power generator of FIG. 1, according to an aspect of the disclosure.

The battery/PV 32 of the solar power generator 10 may be disposed in one end of the housing 16 (see FIG. 11). The battery/PV meter switch 32 may be protected by an AC outlet access panel 30 that may be connected to the housing 16 by a hinge 52. The battery/PV meter switch 32 may be configured with the solar power generator control system and as a toggle switch with at least three positions—battery charge status meter ON, OFF, and PV meter status ON. The toggling of the battery/PV meter switch 32 to the battery charge status meter ON position may result in the battery meter display 34 activating and displaying battery charge level (numerical data) determined by the solar power generator control system. The toggling of the battery/PV meter switch 32 to the PV meter status ON may result in the PV meter display 38 activating and displaying PV solar energy level (numerical data) determined by the solar power generator control system.

The battery status lights 40 of the solar power generator 10 may be disposed in one end of the housing 16 (see FIG. 11). The battery status lights 40 may be protected by the battery charge access panel 44 that may be connected to the housing 16 by a hinge 52. The battery status lights 40 may be configured with the battery 20 and the solar power generator control system to provide a visual indication of the condition of the charging circuit of the battery 20. For example, the battery status lights 40 may include a green, blue, and red light. The red battery status light 40 may illuminate to indicate the current is fully charged. The blue battery status light 40 may illuminate to indicate the voltage is fully charged. The green battery status light 40 may illuminate to indicate that the solar power generator 10 has reached maximum charge level.

According to an aspect of the disclosure, the battery status lights may be configured to illuminate to display information such as full charge, half charge, and low charge. Additionally and alternatively, the battery status lights 40 may be configured in a linear arrangement, such as three lights correspond to a full charge, two lights to half charge, and one light for low charge (no lights may correspond to little or no charge in the battery 20).

The battery charge switch 42 of the solar power generator 10 may be disposed in one end of the housing 16 (see FIG. 11). The battery charge switch 42 may be protected by the battery charge access panel 44 that may be connected to the housing 16 by a hinge 52. The battery charge switch 42 may be configured with the solar power generator control system and as a toggle switch with at least three positions—DC Charge ON, OFF, and AC Charge ON. The toggling of the battery charge switch 42 to the DC Charge ON position may result in the battery charge meter display 34 activating DC charging of the battery 20 (via the solar panels 12) and displaying the battery charge level (numerical data) determined by the solar power generator control system. The toggling of the battery charge switch 42 to the AC Charge ON may result in the battery charge meter display 34 activating AC charging of the battery 20 (via AC mains power) and displaying battery charge level (numerical data) determined by the solar power generator control system.

Figure 13:
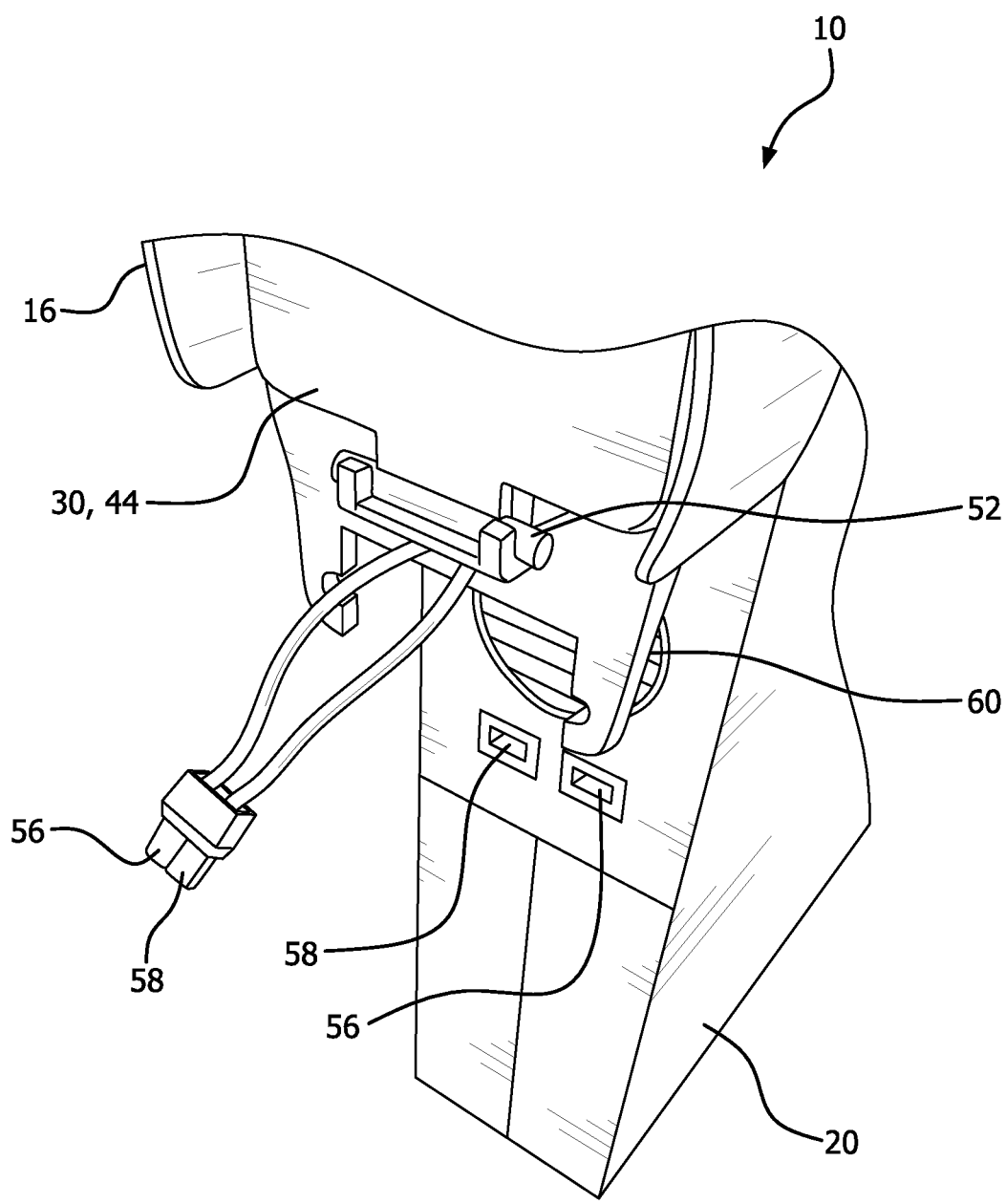
FIG. 13 is a partial rear view of the cooling fan, positive and negative connectors of the solar power generator of FIG. 1, according to an aspect of the disclosure.
Figure 16:
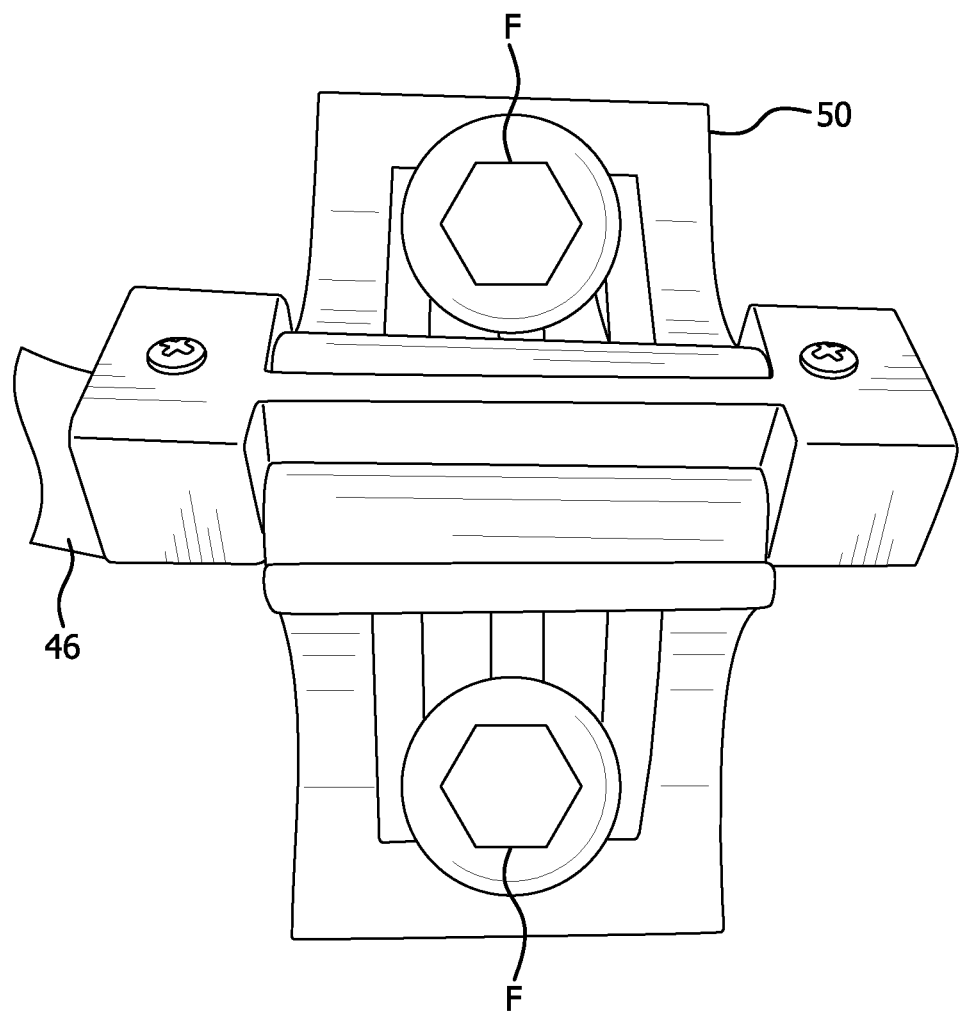
FIG. 16 is a top view of the foot of the solar power generator of FIG. 1, according to an aspect of the disclosure.
Figure 17:
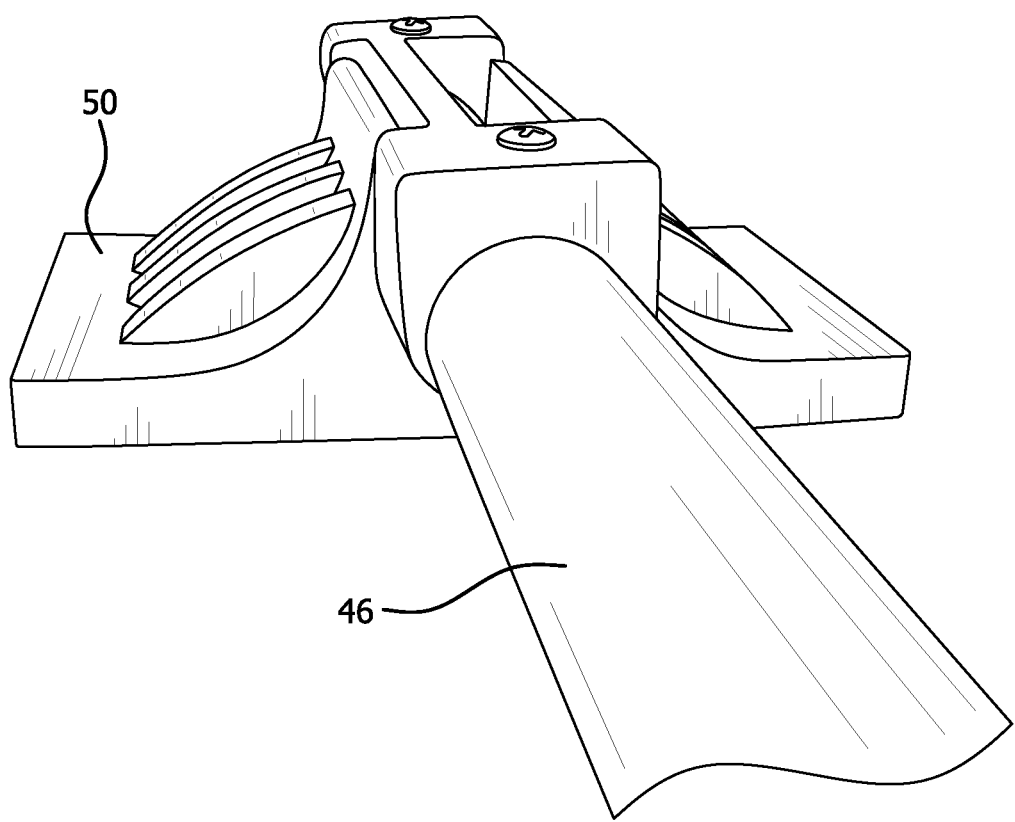
FIG. 17 is a perspective side view of the foot and a portion of the frame of the solar power generator of FIG. 1, according to an aspect of the disclosure.

The frame 46 of the solar power generator 10 may be configured to engage the housing 16 and may include a plurality of frame support arms 48 joined to the frame 46 by a plurality of hinges 52 (see FIGS. 1, 3-4, and 6-7, for example). The frame support arms 48 and the hinges 52 may be configured to permit the frame 46 to move from a first position (stored) to one or more additional positions (deployed). The frame 46 may include a motorized device (not shown) to permit the movement of the frame 16 from one position to another. The motorized device may be controlled automatically, such as by the solar power generator control system or manually by a user/operator. The frame 46 may be configured to receive one or more solar panels 12 including one or more solar cells 14. The frame 46 may include electrical connections and/or wiring connecting the solar panels 12 and/or solar cells 14 with the housing 16, the inverter 18, the battery 20 and the solar power generator control system. The frame 46 may be configured with negative connectors 56 and positive connectors 58 that may permit additional frames 46 of additional solar power generators 10 to be connected together to form a microgrid M. The frame 46 may include one or more feet 50 disposed such that the feet 50 may securely engage a surface (floor, ground) using a fastener F (bolt, screw) and can prevent the solar power generator 10 from moving unexpectedly (see FIGS. 16-17). The frame 46 may be configured with attachment points (not shown) to secure the frame 46 (and the solar power generator 10) to a surface for permanent or semi-permanent operation. The feet 50 may be configured to allow detachment such that access may be gained beneath the solar panel 12, such as for fire-fighting accessibility or rooftop maintenance. For example and without limitation, one or more solar power generators 10 can be connected together to form a microgrid M and connected (attached, removably attached) to a rooftop R or a platform P (see FIGS. 13-14). The solar power generators 10 can be secured for permanent or semi-permanent installation on the rooftop R or platform P, for example, to prevent the solar power generators from being damaged from weather.

Figure 2:
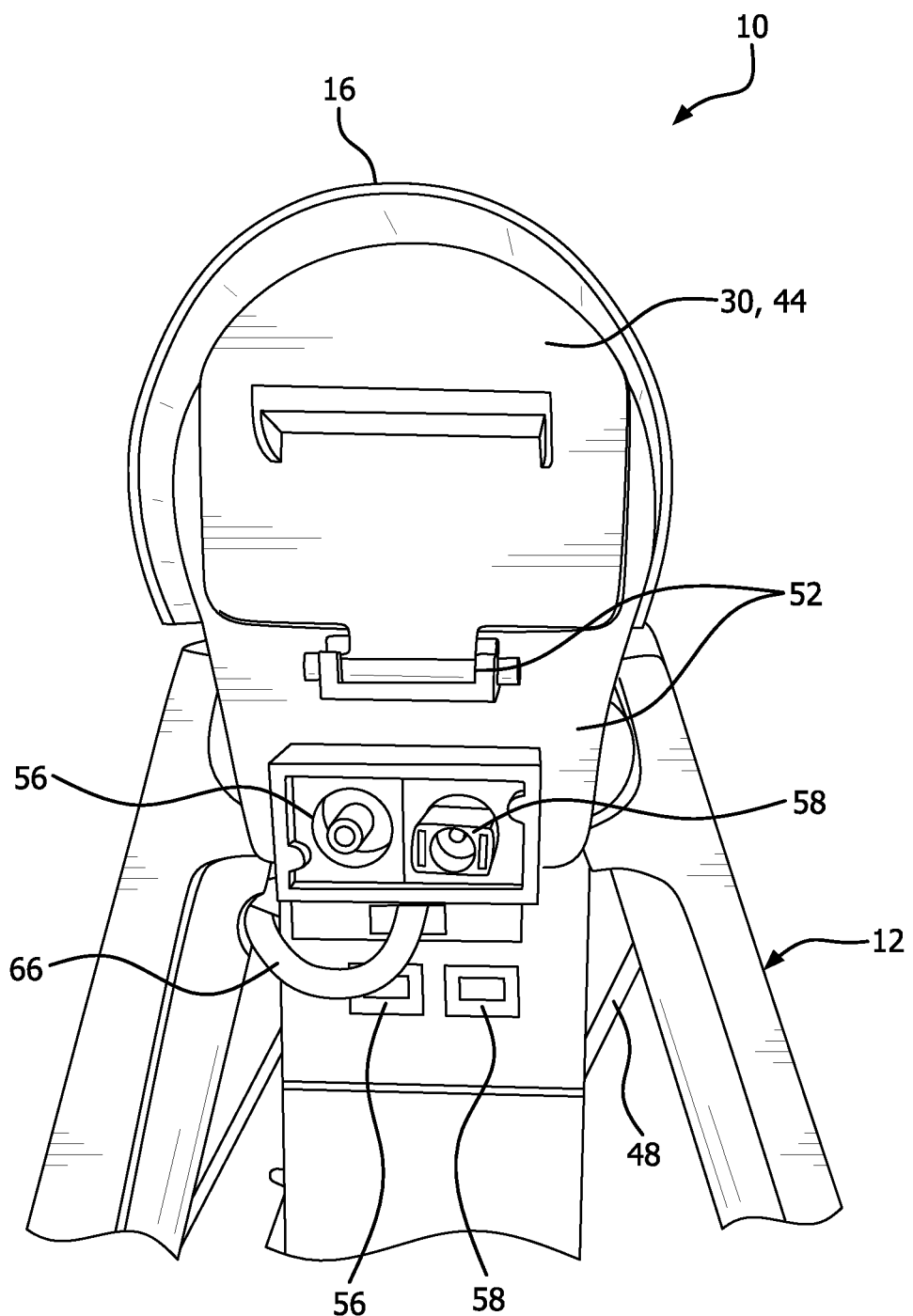
FIG. 2 is a partial front view of the solar power generator of FIG. 1, according to an aspect of the disclosure.

The negative bus bars (connectors) 56 and the positive bus bars (connectors) 58 of the solar power generator 10 may be configured in a variety of positions (see e.g., FIG. 2). For example and without limitation, the negative bus bars 56 and the positive bus bars 58 may be configured on the frame 46 to permit the connection of one solar power generator to one or more solar power generators to form a microgrid M and may include bus bar protective doors (covers) 62. Additionally and alternatively, the negative bus bars 56 and the positive bus bars 58 may be configured to engage cables (not shown) that may permit the solar power generators 10 of the microgrid M to be positioned a distance from each other. The cables may be configured in certain colors (black for negative, red for positive) and include one-directional, one-type connectors to prevent an incorrect cable from being installed. In other words, due to the differences between the negative bus bars 56 and the positive bus bars 58 a negative cable may not fit on a positive connector, and vice versa. Additionally and alternatively, the negative bus bars 56 and the positive bus bars 58 may be disposed on the battery 20 or include a pigtail (cable extension) 66.

The one or more cooling fans 60 of the solar power generator 10 may be disposed within the housing 16 and/or the battery 20 (see e.g., FIG. 3). The cooling fans 60 may be controlled by the inverter 18, the batteries 20, and/or the solar power generator control system. The cooling fans 60 may be configured to circulate air from within the housing 16 to the outside of housing 16 or vice versa. For example, a first pair of cooling fans 60 may be configured within the inverter 18 (within the housing 16) and a second pair of cooling fans 60 may be configured within the battery 20. The solar power generator control system may include one or more temperature sensing devices (thermocouples) that may provide temperature data to the solar power generator control system about temperatures in the housing 16, the inverter 18, and the battery 20. Based on predetermined parameters (algorithms) the solar power generator control system may activate one of more fans 60 to either cool or warm the housing 16, the inverter 18, and the battery 20. For example, in high temperatures, the fans 60 may be configured to circulate air to reduce internal temperatures but in low temperatures, the fans 60 may be configured to circulate air to increase internal temperatures.

According to an aspect of the disclosure, the solar power generator 10 may include one or more LiPo batteries 20 in a ceramic housing 16. The LiPo batteries 20 may include dedicated battery management circuits that may be included with or in addition to the solar power generator control system.

According to an aspect of the disclosure, the solar power generator 10 may include one or more AC outlets 22 connected to an inverter 18. The inverter 18 may convert DC stored in the battery 20 to 120V AC as directed by the solar power generator control system upon activation of the AC/battery charge switch 26.

According to an aspect of the disclosure, the solar power generator 10 may include a battery 20 that may include an inverter 18 with capacities (sizes) ranging, for example, from 1000W to 4500W. The battery 20 may be configured with different capabilities. For example, the capacity of the battery using LiPo batteries, may be increased from 1200W to 4800W without increasing the size (footprint) of the battery 20. The battery 20 may be configured to receive additional capacity by extending downward from the housing 16.

According to an aspect of the disclosure, the solar power generator 10 may include a common bus bar 64 (connector) that may include at least one negative connector 56 and at least one positive connector 58 (see e.g., FIG. 2). The common bus bar 64 and the at least one negative connector 56 and at least one positive connector 58 may permit a plurality of solar power generators 10 to be joined together, for example, forming a microgrid M. The doors 62 may be configured to seal the common bus bar 64 to prevent water or other debris from entering the at least one negative connector 56 and at least one positive connector 58.

According to an aspect, the solar power generator 10 may include two different charging circuits (systems, processes). A first charging circuit may be a DC charging circuit for charging using the solar panels 12 with solar cells 14. The DC charging circuit may be the default charging circuit for outdoor operation, such as if the solar power generator control system detects a high level of charging activity from the solar panels 12 due to their exposure to bright (sun) light. A second charging circuit may be an AC charging circuit for charging using AC mains power (wall plug), such as during a cloudy day (lack of sunlight) or indoor operation. The AC charging circuit may include a cable (not shown) with a unique connector to engage the battery charging input 24.

According to an aspect of the disclosure, the solar power generator 10 may include a double default operating mode of the solar power generator control system. The double default operating mode prevents the solar power generator 10 from being charged by both DC and AC simultaneously. The battery/PV meter switch 32 and the battery charge switch 42 due to their toggling operation, prevent the charging of the solar power generator 10 by both DC (solar) and AC (mains) sources. The double default operating mode may include the automatic switching from an AC mode (during nighttime outdoors) to a DC mode (during daytime outdoors).

Figure 14:
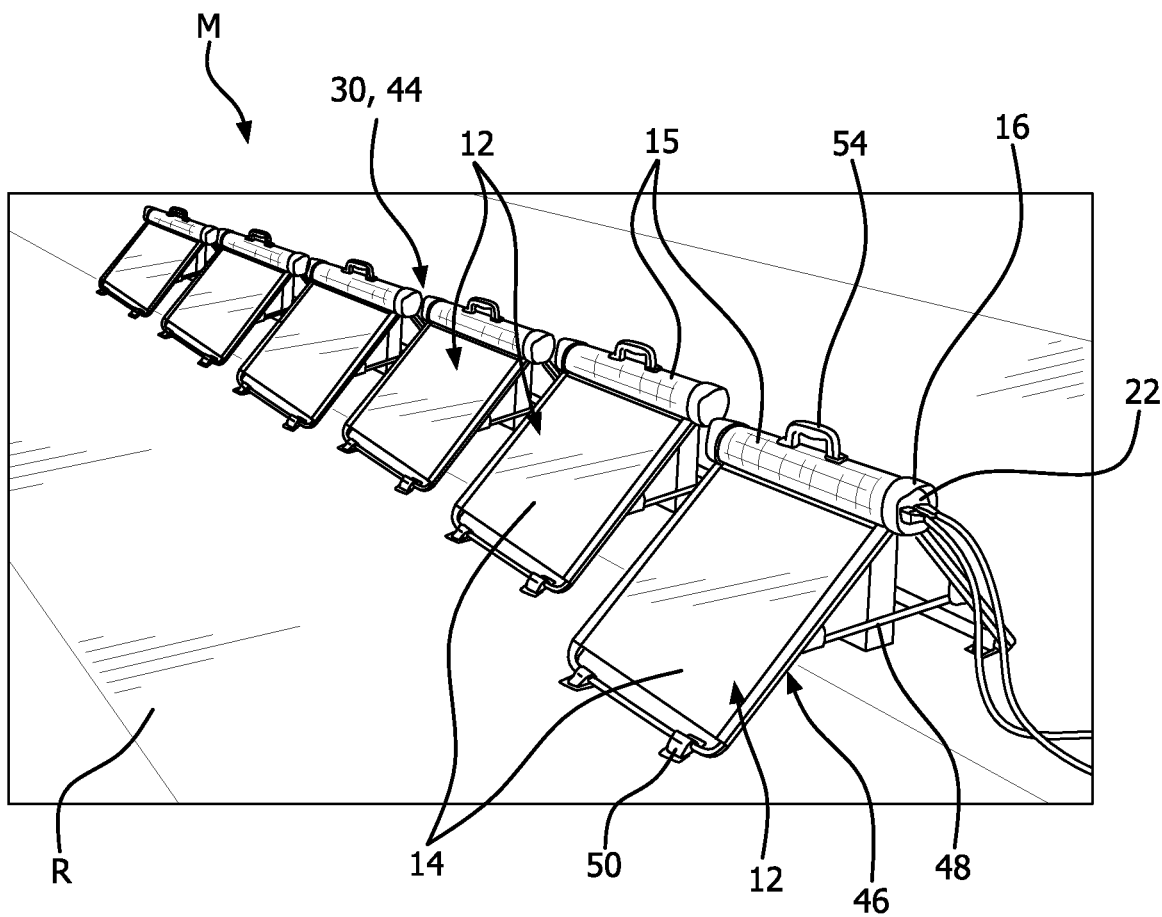
FIG. 14 is a perspective view of a rooftop microgrid formed of several units of the solar power generator of FIG. 1, according to an aspect of the disclosure.
Figure 15:
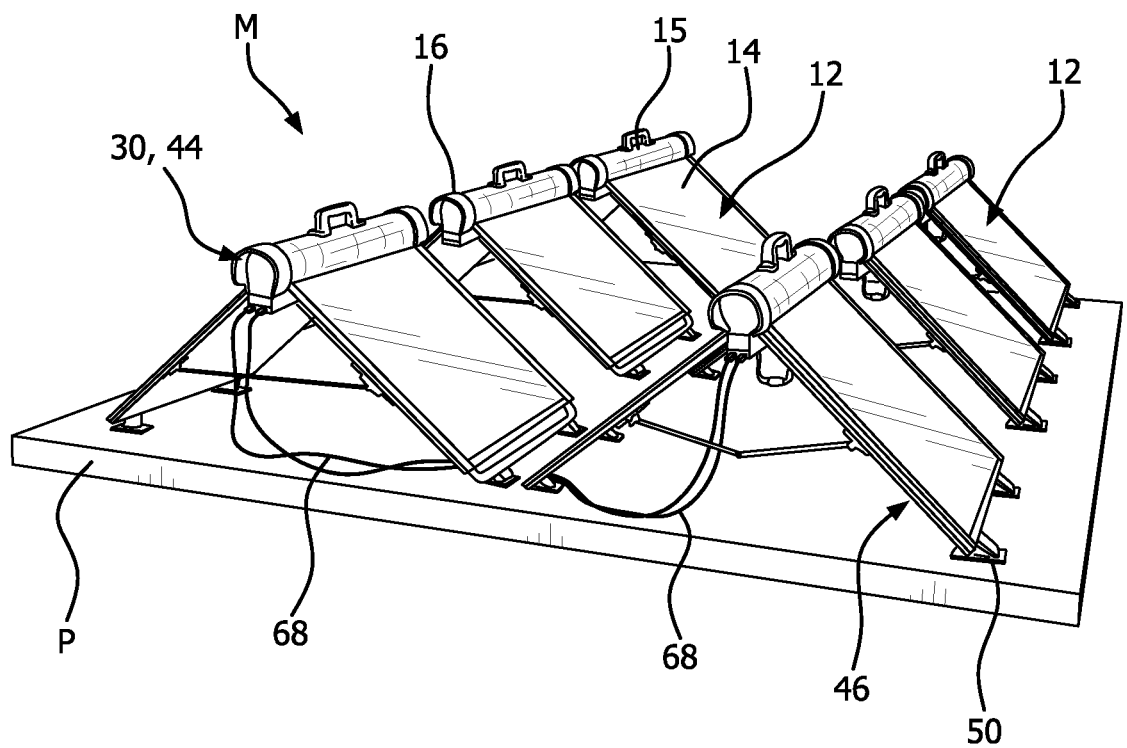
FIG. 15 is a perspective view of a platform including a microgrid formed of several units of the solar power generator of FIG. 1, according to an aspect of the disclosure.

According to an aspect of the disclosure, one or more solar power generators 10 may be configured permanently outdoors, such as on a rooftop R or other surface (platform P) exposed to the sun (see FIGS. 14-15). The solar power generator control system may be configured to automatically switch between DC (solar) and AC (mains) charging of the battery 20 depending upon ambient conditions. For example, at nighttime, solar activity is low, so the solar power generator control system may switch from DC charging to AC charging. This has the additional benefit of lower-cost AC power during off-peak usage periods. At daytime, solar activity is higher, so the so the solar power generator control system may switch from AC charging to DC charging. This has the additional benefit of avoiding higher-cost AC power during on-peak usage periods. Additionally and alternatively, the solar power generator 10 may be configured to return AC power to the existing electrical grid.

According to an aspect of the disclosure, the solar panels 12 may include a removable lens 70 (see FIG. 1). The removable lens 70 may be configured to allow access to the solar cells 14 of the solar panel 12, such as for maintenance or to change from a first type of solar cell 14 to a second type of solar cell 14. For example, the solar cells 14, 15 may be configured to include two types of solar cells 14, 15 (amorphous and monocrystalline) to take advantage of local operating conditions. If the solar power generator 10 is moved to another location, the solar cells 14, 15 may be re-configured for the new location local operating conditions. It should be understood that solar cells 14, 15 may also be combined together in a plurality of ratios, on a plurality of types of surfaces that can range from flat to curved or more complicated and/or compound types of surfaces.

The preceding description is merely exemplary in nature of the subject matter, manufacture and use of one or more disclosures, and is not intended to limit the scope, application, or uses of any specific disclosure claimed in this application or in such other applications as may be filed claiming priority to this application, or patents issuing therefrom. Regarding methods disclosed, the order of the steps presented is exemplary in nature, and thus, the order of the steps may be different in various aspects. The terms "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the disclosure. The term "about" when applied to numerical values indicates that the calculation or the measurement allows some slight imprecision in the value (with some exactness in value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim aspects of the present disclosure, aspects may alternatively be described using more limiting terms such as "consisting of or "consisting essentially of." Thus, for any given aspect reciting materials, components, or process steps, the present disclosure also specifically includes aspects consisting of, or consisting essentially of, such materials, components, or process steps excluding additional materials, components or processes (for consisting of) and excluding additional materials, components or processes affecting the significant properties of the aspect (for consisting essentially of), even though such additional materials, components or processes are not explicitly recited in this application. For example, recitation of a composition or process reciting elements A, B and C specifically envisions aspects consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10, 2-8,2-3,3-10,3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example aspects.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Obviously, many modifications and variations of the present disclosure are possible in light of the above teachings and may be practiced otherwise than as specifically described while within the scope of the appended claims. Individual elements or features of a particular aspect are generally not limited to that particular aspect, but, where applicable, are interchangeable and may be used in a selected aspect, even if not specifically shown or described.

What is claimed is:

1. A portable solar power generator comprising:
 a foldable frame comprising a first leg, a hinge and a second leg, the first and second legs connected by the hinge to form an A-frame, the foldable frame being adaptable to a first configuration in which the foldable frame is closed, and a second configuration in which the foldable frame is open;

an energy storage module detachably connected to the foldable frame between the first and second legs, the energy storage module comprising a battery for storing energy, a DC output terminal, an inverter, and an AC output terminal providing AC output from the inverter;

the foldable frame further comprising a solar panel supported on each of the first and second legs, and a charge conductor connectable to the energy storage module;

the energy storage module comprising a controller adapted to control charging of the battery with energy received from the solar panels via the charge conductor.

2. The portable solar power generator of claim 1, further comprising a detachable foot, detachably connected to a bottom portion of the foldable frame, adapted to be fixed to a floor surface, and to permit detachment from the foldable frame while remaining fixed to the floor surface.

3. The portable solar power generator of claim 1, wherein the energy storage module comprises at least one lithium polymer (LiPo) battery for storing energy.

4. The portable solar power generator of claim 1, where the energy storage module comprises a handle for lifting the foldable frame and energy storage module when the energy storage module is attached to the foldable frame, and for lifting the energy storage module out of the foldable frame when the energy storage module is detached from the foldable frame.

5. The portable solar power generator of claim 1, further comprising a display that displays status information regarding the charging status of the portable solar power generator.

6. The portable solar power generator of claim 1, further comprising connecting terminals adapted to connect to corresponding connecting terminals of another portable solar power generator unit and for transferring current between the connected solar power generators.

7. The portable solar power generator of claim 1, wherein the energy storage module comprises a tube-shaped photovoltaic panel.

8. A micro-grid comprising two or more electrically connected portable solar power generators of claim 1.

* * * * *